July 8, 1947.
C. E. TACK
2,423,736
SHOCK STRUT
Filed March 29, 1943
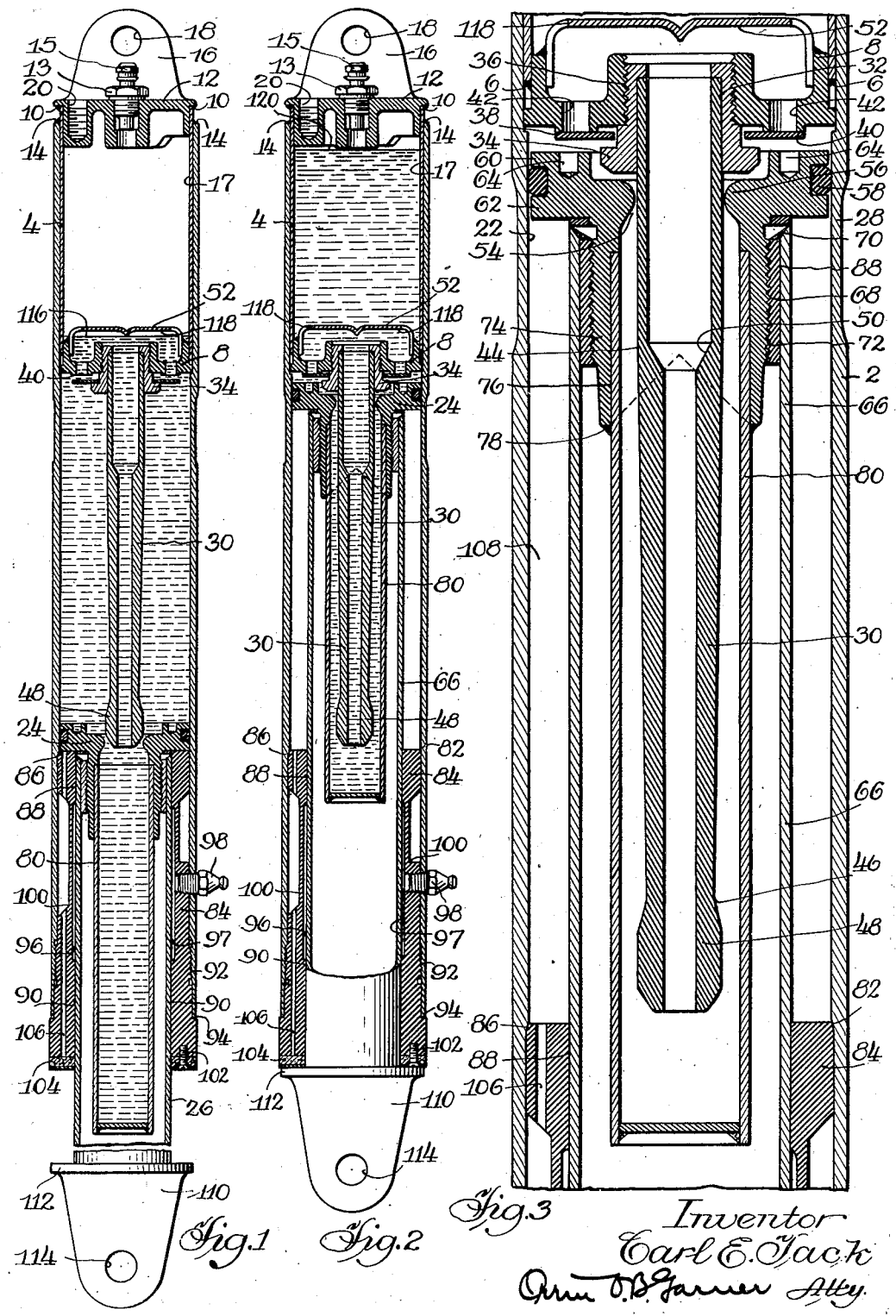
Inventor
Carl E. Tack Patented July 8, 1947

2,423,736

UNITED STATES PATENT OFFICE 2,423,736

SHOCK STRUT

Carl E. Tack, Chicago, Ill., assignor to American Steel Foundries, Chicago, Ill., a corporation of New Jersey Application March 29, 1943, Serial No. 480,900

30 Claims. (Cl. 267—64)

My invention relates to shock absorber struts of the type generally associated with aircraft landing gear, and particularly to a novel form of oleo pneumatic type strut which includes a cylinder with a piston slidably mounted therein.

The general object of my invention is to devise a novel and improved form of such a shock absorbing strut which will be relatively simple and convenient to manufacture, while at the same time meeting the standard requirements at present set up, particularly for severe usage such as in military service.

A specific object of my invention is to devise such an arrangement wherein a novel form of metering pin may be used, so constructed and arranged as to afford the variable control necessary at the several stages of compression as the device is placed under load and released successively, as commonly occurs in usage.

A different object of my invention is to provide a hollow metering pin affording one of the means of control in a device of the character described, said hollow metering pin having a contour suitable to effect the desired control of the flow of fluid. In my novel arrangement the outside contour of the metering pin is important and likewise the inside contour of said pin is effective for certain purposes hereinafter to be described.

In the drawings, Figure 1 is a side elevation partly in section with the section taken substantially in a plane bisecting the strut, that is, along one diameter thereof with the parts in extended position. Figure 2 is a showing comparable to that of Figure 1 except that the parts are shown in contracted position or in compression. Figure 3 is an enlarged view of the central portion of Figure 2 showing more clearly certain parts and their relationship.

Describing my novel structure in detail, the strut is of a type generally well known, utilizing a substantially noncompressible liquid, such as oil, and a highly compressible gas, such as air, confined within a cylinder and piston in cooperative relationship, and including means for restricting the flow of the noncompressible fluid as the device is contracted. As illustrated, my novel strut comprises the cylinder 2 (Figure 3) within the upper end of which may be mounted, as by a slip fit, the cylinder head and bulkhead assembly, said assembly comprising the liner 4 to the lower end of which may be welded as at 6, 6 (Figure 3) the bulkhead 8 and to the upper end of which may be welded as at 10, 10 the cylinder head 12, said assembly being welded to the upper end of said cylinder as at 14, 14 after insertion therein. Formed as an integral part of the cylinder head 12 may be the secured bracket 16 having a pivotal opening at 18 for mounting purposes, and for the same purpose the cylinder head 12 may be drilled as at 20 for attachment of other securing means. The cylinder head 12 may have a filler plug 13 centrally fitted therein and an air valve 15 through which compressed air or other gas may be forced into the air and oil chamber 17 at the upper end of the cylinder. The bulkhead 8 comprises certain details which will be hereinafter more particularly described.

Centrally of the cylinder 2 may be formed the smoothly bored portion 22 (Figure 3) for cooperation with the orifice plate 24 associated with the piston, generally designated 26. At the upper extremity of the piston cooperating portion 22 the outer circumference of the cylinder 2 may be slightly relieved therearound for a restricted portion of its length as at 28 (Figure 3), thus affording a weakened area through which the strut may break under maximum stress without damaging other parts of the airplane structure, such as the wing, in which it may be mounted.

Associated with the cylinder head and bulkhead assembly, already referred to, may be my hollow metering tube 30 of novel form, the upper open end of which may have a press fit, as at 32 with the sleeve 34, said sleeve having a hexagonal bottom portion to facilitate removal thereof for repair purposes and having threaded engagement at its upper end as at 36 with the bulkhead 8. Associated with the sleeve 34 may be the flapper valve plate 38 which may seat as at 40 against the bottom of the bulkhead 8 to close the series of openings 42, 42 therein when the device is placed in compression and permit the opening thereof as the device is expanded.

As may be clearly seen in the enlarged view of Figure 3, the metering pin 30 has at its upper end a maximum outside diameter which extends approximately to the point designated 44, whence it tapers gradually to a minimum outside diameter at 46 adjacent the bulbous end 48 thereof. As already indicated, said metering tube 30 is hollow, the inner diameter thereof being substantially constant from the lower end approximately to the point 44 where the inner diameter is sharply expanded as at 50 to greatly reduce the velocity of the liquid flowing therethrough in the direction of the baffle 52 which may be mounted on the bulkhead 8 over the opening at the upper end of the metering tube, as well as over the before-mentioned orifices 42, 42, said baffle serving to brake the flow of said liquid and to avoid a foaming action thereof.

In the fully expanded position illustrated in Figure 1 the bulbous end 48 of the metering tube is closely adjacent the orifice 54 (Figure 3) centrally formed in the orifice plate 24, said orifice 54 being defined by the smoothly rounded annular shoulder 56, well illustrated in the enlarged view of Figure 3. About the outer perimeter of the orifice plate 24 may be fitted the oil ring 58, said oil ring being confined between the upper and lower annular shoulders 60 and 62 having loose fit with the inner bore 22 of the cylinder so that the oil ring 58 is in sliding cooperation with said bore 22. The orifice plate 24 may be formed with a series of recesses 64, 64 affording convenient means of rotating said plate with respect to the piston rod 66, said piston rod having at its upper end a sleeve 68, which may be brazed on the inner diameter of said piston rod and welded thereto as at 70 so that said sleeve 68 may conveniently be mounted in threaded engagement as at 72 with the tubular lower portion 74 formed as an integral part of said orifice plate 24.

Also secured to the orifice plate 24, as by a press fit at 76 and a weld at 78, may be the tubular metering pin chamber 80, said chamber accommodating the metering pin 30 as the device is compressed, all as well illustrated in the enlarged view of Figure 3.

At the lower extremity of the bore 22 may be formed the shoulder 82 defining the slightly enlarged inner diameter of the lower portion of the cylinder 2 within which may be positioned, as by a sliding fit, the piston guide 84, a sleeve-like member abutting the shoulder 82 as at 86 (Figure 3) and in sliding and guiding engagement on its inner diameter adjacent the upper end thereof as at 88 and adjacent the lower end thereof as at 90 (Figure 2) with the piston rod 66. The piston guide 84 may have threaded engagement as at 92 with the lower end of the cylinder 2 as seen in Figure 2, and may be shouldered as at 94 for abutment therewith. Along its central portion the piston guide 84 may be relieved on its inner diameter as at 96 to form with the piston rod 66 a lubricant cavity 97, access to said cavity being afforded by the fitting 98 for that purpose. The weight of the piston guide 84 may be reduced by an annular recess formed about its outer perimeter as at 100. At the lower extremity of the piston guide 84 may be mounted as by threaded bolts 102, 102 the wiper and filter ring 104, said ring affording a filter for atmospheric air which may be drawn through the orifice 106, said orifice extending the length of said piston guide and affording atmospheric air access to the annular air chamber 108 (Figure 3), which may be formed thereabove as the piston enters the cylinder on the compression stroke. Likewise, the orifice 106 permits the escape of said air as the device is expanded.

The lower end of the piston 26 may be formed with the secured bracket 110, defined at its upper end by the annular shoulder 112 and formed with the pivot opening 114 adjacent its lower end.

Assuming the device is in the expanded position illustrated in Figure 1, it will be noted that the metering pin chamber 80, the cylinder cavity above the orifice plate 24, and the hollow metering pin 30 are filled with a substantially noncompressible liquid approximately to the level indicated at 116 (Figure 1). When the parts are in this position, the bulbous end 48 of the metering pin 30 is just entering the orifice 54 of the orifice plate and as the device is placed under compression, the said bulbous end enters the orifice 54, sharply restricting the flow of the liquid therethrough for a short period as the bulbous head 48 passes through said orifice. Immediately thereafter, the flow is somewhat less restricted as the minimum outside diameter 46 of the metering pin enters the orifice 54 and the flow of the oil from the metering pin chamber 80 through the orifice 54 and through the metering pin itself is at that instant under minimum restriction. The restriction is gradually built up from that point as the tapering metering pin enters the chamber 80, and it will be understood by those skilled in the art that at the instant compression begins, the flapper valve 38 closes so that the oil confined in the cylinder between the bulkhead 8 and the orifice plate 24 is compelled to flow through the orifice 54 into the metering pin chamber and then out of the metering pin chamber through the hollow metering pin itself. As the oil flows under compression through the metering pin 30, the rate of flow of the oil is sharply reduced at the shoulder 50 adjacent the upper end of the metering pin, and, as it flows through the opening at the upper end of the metering pin, may strike the baffle 52 and be deflected to escape into the upper end of the cylinder through the openings 118, 118 (Figure 2) about the perimeter of said baffle. As compression continues to the end of the stroke, the condition illustrated in Figure 2 is reached where the oil has been forced to the upper extremity of the cylinder, reaching the level indicated approximately at 120. In this condition there is a minimum amount of oil between the orifice plate 24 and the bulkhead 8, most of the oil previously therein having been forced through the passages already described as the force of the compression blow is absorbed and dissipated. Under the conditions illustrated in Figure 2, the highly compressible gas, sometimes air, normally present in the upper end of the cylinder has been greatly reduced in volume, as well illustrated in that figure.

As pressure is released, the compressed gas urges the piston 26 downwardly in what may be termed the release or extension stroke of the strut; and it will be understood that during the extension stroke, the flapper valve plate 38 is urged, by means of hydraulic pressure thereagainst, into engagement with the sleeve 34 as shown in Figure 1 to permit passage of the oil through the openings 42, 42 in the bulkhead, thus facilitating rapid release or extension of the strut.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In an oleo pneumatic shock strut, a cylinder having a bulkhead at one end, a piston guide at the opposite end and an intermediate bulkhead, a piston supported in said guide for reciprocal movement with said cylinder, and a substantially noncompressible liquid and a pressure gas confined within said cylinder, said piston having at its upper end an orifice plate supporting a metering pin chamber open to said cylinder, said intermediate bulkhead supporting a hollow metering pin receivable within said chamber and affording a passage for said liquid from said chamber into the portion of said cylinder above said bulkhead, said metering pin having a bulbous lower end operable to substantially close the opening between said metering pin chamber and said cylinder at the instant the compression stroke begins and tapering from minimum diameter adjacent the bulbous end to maximum diameter adjacent the upper end thereof, said bulbous end and said upper end of said metering pin having substantially equal cross-sectional area.

2. In a shock strut of oleo pneumatic type, a cylinder having a cylinder head at one end, a piston guide at the opposite end and an intermediate bulkhead, a hollow piston mounted in said guide, an orifice plate in the upper end of said piston, a liquid and a gas under pressure within said cylinder, the opposite ends of said guide being supported from the walls of said cylinder with an intermediate area of clearance between said guide and said walls, a longitudinal orifice in said guide open to admit atmospheric air into said cylinder below said orifice plate as said strut is compressed, said orifice plate affording support for a metering pin chamber in said piston open to said cylinder, and a hollow metering pin mounted in said bulkhead and receivable in said metering pin chamber as said strut is compressed and affording a passageway from said chamber to the portion of said cylinder above said bulkhead, said bulkhead having a valve automatically closing as said strut is compressed and automatically opening as said strut is released.

3. In a shock strut of oleo pneumatic type, a cylinder having a cylinder head at one end, a piston guide at the opposite end and an intermediate bulkhead, a hollow piston mounted in said guide, an orifice plate at the upper end of said piston, a liquid and a gas under pressure within said cylinder, the opposite ends of said guide being supported from the walls of said cylinder with an intermediate area of clearance between said guide and said walls, said guide having bearing against said piston adjacent its opposite ends and an intermediate clearance therefrom to afford a lubricant cavity, a longitudinal orifice in said guide open to admit atmospheric air into said cylinder below said orifice plate as said strut is compressed, said orifice plate affording support for a metering pin chamber in said piston open to said cylinder, and a hollow metering pin mounted in said bulkhead and receivable in said metering pin chamber as said strut is compressed and affording a passageway from said chamber to the portion of said cylinder above said bulkhead.

4. In a shock strut of oleo pneumatic type, a cylinder, a hollow piston mounted in said cylinder for reciprocal movement with respect thereto, a substantially noncompressible liquid and a pressure gas confined in said cylinder, a cylinder head at the upper end of said cylinder, a bulkhead in said cylinder spaced from said cylinder head to define a chamber at the upper end of said cylinder, said bulkhead supporting a downwardly directed metering pin, and an orifice plate mounted at the upper extremity of said piston affording support for a metering pin chamber in said piston, said orifice plate having a central opening affording passage for said metering pin and permitting liquid flow from said cylinder into said metering pin chamber, said metering pin having an opening therethrough affording passage of said liquid from said metering pin chamber through said bulkhead into said first-mentioned chamber at the upper end of said cylinder, said opening being closed except at the ends of said pin against communication with said cylinder and said metering pin chamber, whereby on the closure stroke of the strut, said liquid is forced from said cylinder into said metering pin chamber and thence through said passage into the first-mentioned chamber.

5. In a shock strut, a cylinder having at one end a cylinder head with a lubricant plug and air valve, having at its opposite end a piston guide, and having an intermediate bulkhead, the walls of said cylinder having an area of relative thinness to afford a frangible portion, a piston mounted in said guide with an orifice plate at the upper end thereof, a metering pin chamber supported from said plate under the orifice therein affording passage between said chamber and cylinder, and a hollow metering pin mounted in said bulkhead and receivable in said chamber as said strut is compressed, said bulkhead having a valve automatically closing as said strut is compressed and automatically opening as said strut is released, said metering pin in cooperation with said orifice plate affording a relatively restricted passageway from the portion of said piston below said bulkhead to the portion of said piston above said bulkhead when said valve is closed.

6. In a shock strut, a cylinder having at one end a cylinder head with a lubricant plug and air valve, having at its opposite end a piston guide, and having an intermediate bulkhead, the walls of said cylinder having an area of relative thinness to afford a frangible portion, a piston mounted in said guide with an orifice plate at the upper end thereof, a metering pin chamber supported from said plate under the orifice therein affording passage between said chamber and said cylinder, and a hollow metering pin mounted in said bulkhead and receivable in said chamber as said strut is compressed, said bulkhead having a valve automatically closing as said strut is compressed and automatically opening as said strut is released, said metering pin, said orifice plate, and said chamber affording a relatively restricted and elongated passageway from the portion of said cylinder below said bulkhead to the portion of said cylinder thereabove when said valve is closed.

7. In an oleo pneumatic shock strut, a cylinder having a cylinder head at one end, a piston guide at the opposite end and an intermediate bulkhead, a piston supported in said guide for reciprocal movement with said cylinder, and a substantially noncompressible liquid and a pressure gas confined within said cylinder, said piston having at its upper end an orifice plate supporting a metering pin chamber open to said cylinder, said bulkhead supporting a hollow metering pin receivable within said chamber and affording a passage for said liquid from said chamber into the portion of said cylinder above said bulkhead, said hollow metering pin having a substantially constant inner diameter along the lower portion thereof and a substantially expanded inner diameter along the upper portion thereof, and a baffle mounted in said cylinder adjacent said bulkhead and over the adjacent orifice of said metering pin.

8. In a shock strut of oleo pneumatic type, a cylinder having a cylinder head at one end, a piston guide at the opposite end and an intermediate bulkhead, a hollow piston mounted in said guide, an orifice plate in the upper end of said piston, a liquid and a gas under pressure within said cylinder, the opposite ends of said guide being supported from the walls of said cylinder with an intermediate area of clearance between said guide and said walls, a longitudinal orifice in said guide open to admit atmospheric air into said cylinder below said orifice plate as said strut is compressed, said orifice plate affording support for a metering pin chamber in said piston open to said cylinder, and a hollow metering pin mounted in said bulkhead and receivable in said metering pin chamber as said strut is compressed and affording a passageway from said chamber to the portion of said cylinder above said bulkhead.

9. In an oleo pneumatic shock strut, a cylinder having a cylinder head at one end, a piston guide at the opposite end and an intermediate bulkhead, a piston supported in said guide for reciprocal movement with said cylinder, and a substantially noncompressible liquid and a pressure gas confined within said cylinder, said piston having at its upper end an orifice plate supporting a metering pin chamber open to said cylinder, said bulkhead supporting a hollow metering pin receivable within said chamber and affording a passage for said liquid from said chamber into the portion of said cylinder above said bulkhead, said metering pin having a bulbous lower end operable to substantially close the opening between said metering pin chamber and said cylinder at the instant the compression stroke begins.

10. In an oleo pneumatic shock strut, a cylinder having a cylinder head at one end, a piston guide at the opposite end and an intermediate bulkhead, a piston supported in said guide for reciprocal movement with said cylinder, and a substantially noncompressible liquid and a pressure gas confined within said cylinder, said piston having at its upper end an orifice plate supporting a metering pin chamber open to said cylinder, said bulkhead supporting a hollow metering pin receivable within said chamber and affording a passage for said liquid from said chamber into the portion of said cylinder above said bulkhead, said bulkhead having a valve automatically closing as said strut is compressed and automatically opening as said strut is released.

11. In an oleo pneumatic shock strut, a cylinder having a cylinder head at one end, a piston guide at the opposite end and an intermediate bulkhead, a piston supported in said guide for reciprocal movement with said cylinder, and a substantially noncompressible liquid and a pressure gas confined within said cylinder, said piston having at its upper end an orifice plate supporting a metering pin chamber open to said cylinder, said bulkhead supporting a hollow metering pin receivable within said chamber and affording a passage for said liquid from said chamber into the portion of said cylinder above said bulkhead, said hollow metering pin having a substantially constant inner diameter along the lower portion thereof and a substantially expanded inner diameter along the upper portion thereof.

12. In a shock strut, a cylinder having at one end a cylinder head with a lubricant plug and air valve, having at its opposite end a piston guide, and having an intermediate bulkhead, the walls of said cylinder having an area of relative thinness to afford a frangible portion, a piston mounted in said guide with an orifice plate at the upper end thereof, a metering pin chamber supported from said plate under the orifice therein affording passage between said chamber and said cylinder, and a hollow metering pin mounted in said bulkhead and receivable in said chamber as said strut is compressed, said bulkhead having a valve automatically closing as said strut is compressed and automatically opening as said strut is released.

13. In a shock strut, a cylinder having at one end a cylinder head with a lubricant plug and air valve, having at its opposite end a piston guide, and having an intermediate bulkhead, a piston mounted in said guide with an orifice plate at the upper end thereof, a metering pin chamber supported from said plate under the orifice therein affording passage between said chamber and said cylinder, and a hollow metering pin mounted in said bulkhead and receivable in said chamber as said strut is compressed, said bulkhead having a valve automatically closing as said strut is compressed and automatically opening as said strut is released.

14. A shock strut comprising a cylinder having at its upper end a cylinder head, at its lower end a piston guide, and an intermediate bulkhead with a one-way valve, a piston mounted in said guide with an orifice plate at its upper end supporting a metering pin chamber, and a hollow metering pin mounted in said bulkhead and affording a restricted passage via said orifice between the portions of said cylinder at opposite sides of said bulkhead when said valve is closed, said metering pin having a bulbous end operable substantially to close the orifice in said plate momentarily at the beginning of the compression stroke.

15. In an oleo pneumatic shock strut, a cylinder having a bulkhead at one end, a piston guide at the opposite end and an intermediate bulkhead, a piston supported in said guide for reciprocal movement with said cylinder, and a substantially noncompressible liquid and a pressure gas confined within said cylinder, said piston having at its upper end an orifice plate supporting a metering pin chamber open to said cylinder, said intermediate bulkhead supporting a hollow metering pin receivable within said chamber and affording a passage for said liquid from said chamber into the portion of said cylinder above said intermediate bulkhead, said pin being imperforate from end to end thereof whereby said liquid may enter said passage only at one or the other end of said pin.

16. A shock strut comprising a cylinder having at its upper end a cylinder head, at its lower end a piston guide, and an intermediate bulkhead with a one-way valve, a piston mounted in said guide with an orifice plate at its upper end supporting a metering pin chamber, and a hollow metering pin mounted in said bulkhead and affording a restricted passage via said orifice between the portions of said cylinder at opposite sides of said bulkhead when said valve is closed, said metering pin having a substantially constant inner diameter for a major portion of its length and a greatly expanded inner diameter for the remainder thereof.

17. A shock strut comprising a cylinder having at its upper end a cylinder head, at its lower end a piston guide, and an intermediate bulkhead with a one-way valve, a piston mounted in said guide with an orifice plate at its upper end supporting a metering pin chamber, a hollow metering pin mounted in said bulkhead and affording a restricted passage via said orifice between the portions of said cylinder at opposite sides of said bulkhead when said valve is closed, and a baffle mounted on said bulkhead adjacent one end of said metering pin.

18. A shock strut comprising a cylinder having at its upper end a cylinder head, at its lower end a piston guide, and an intermediate bulkhead with a one-way valve, a piston mounted in said guide with an orifice plate at its upper end supporting a metering pin chamber, and a hollow metering pin mounted in said bulkhead and affording a restricted passage via said orifice between the portions of said cylinder at opposite sides of said bulkhead when said valve is closed.

19. In a shock strut having a cylinder with a hollow piston, an intermediate bulkhead in said cylinder having a one-way valve and supporting a hollow metering pin, said piston having an opening with a metering pin chamber thereunder, said metering pin affording a restricted passage via said opening and chamber between portions of said cylinder at opposite sides of said bulkhead when said valve is closed.

20. In a shock strut having a cylinder with a hollow piston, an intermediate bulkhead in said cylinder having a one-way valve and supporting a hollow metering pin, said piston having an opening with a metering pin chamber thereunder, said metering pin affording a restricted passage via said opening and chamber between portions of said cylinder at opposite sides of said bulkhead when said valve is closed, said metering pin having a varying contour effective to modify the degree of said restriction according to the position of said metering pin in said opening.

21. An oleo shock strut comprising a cylinder with an intermediate bulkhead having a one-way valve and supporting a hollow metering pin, and a piston below said bulkhead carrying an otherwise closed chamber with an opening for said pin, said metering pin and chamber affording a restricted passageway between the portions of said cylinder above and below said bulkhead when said valve is closed upon compression of said strut.

22. An oleo shock strut comprising a cylinder with an intermediate bulkhead having a one-way valve and supporting a hollow metering pin, and a piston below said bulkhead carrying a metering pin chamber, said metering pin and chamber affording a restricted passageway between the portions of said cylinder above and below said bulkhead when said valve is closed upon compression of said strut, said metering pin having a bulbous end and a tapering contour effective to modify the degree of such restriction as its position shifts within said chamber.

23. An oleo shock strut comprising a cylinder with a piston at one end carrying a metering pin chamber below a restricted opening therein, an intermediate bulkhead in said cylinder supporting a hollow metering pin and having a one-way valve, said valve affording a relatively free passageway between the portions of said cylinder above and below said bulkhead as said strut is expanded, and said metering pin and chamber affording a restricted passage between said portions as said strut is compressed.

24. An oleo shock strut comprising a cylinder with a piston at one end carrying a metering pin chamber below a restricted opening therein, an intermediate bulkhead in said cylinder supporting a hollow metering pin and having a one-way valve, said valve affording a relatively free passageway between the portions of said cylinder above and below said bulkhead as said strut is expanded, and said metering pin and said chamber affording a restricted passage between said portions as said strut is compressed, said pin having a tapering contour modifying the degree of such restriction according to its position within said chamber.

25. An oleo shock strut comprising a cylinder with a piston at one end carrying a metering pin chamber below a restricted opening therein, an intermediate bulkhead in said cylinder supporting a hollow metering pin and having a one-way valve, said valve affording a relatively free passageway between the portions of said cylinder above and below said bulkhead as said strut is expanded, and said metering pin and chamber affording a restricted passage between said portions as said strut is compressed, said pin having an enlarged end entering said opening at the start of compression to afford maximum restriction of said passage at that moment.

26. In a shock strut, a cylinder, a piston reciprocal therein, a bulkhead fixed to said cylinder intermediate its ends and carrying a hollow metering pin affording a passageway for liquid through said bulkhead on compression of said strut, and a one-way valve in said bulkhead affording a reverse passage for said liquid as said strut is expanded.

27. In a shock strut, a cylinder, a piston therein with an opening, an intermediate bulkhead in said cylinder carrying a hollow metering pin receivable within said opening for reciprocating movement with respect to said piston, said pin affording a restricted passage for liquid between the portions of said cylinder above and below said bulkhead as said piston is compressed, said bulkhead having a one-way valve affording an additional passageway between said portions as said piston is retracted.

28. In a shock absorbing device, a cylinder member, a piston member reciprocal therewithin, a bulkhead carried by said cylinder member, an opening through said bulkhead, a hollow metering pin carried by said bulkhead in said opening, said pin having an internal metering passage communicating with chambers within said cylinder member at opposite sides of said bulkhead, and flapper valve means accommodating flow of fluid between said chambers independently of said passage on the extension stroke of said device, flow of fluid between said chambers on the closure stroke being permitted only through said passage.

29. A shock absorbing strut for aircraft comprising telescoping cylinders, the outer cylinder having its outer end closed, telescoping tubular members located in and supported, respectively, by the outer and inner cylinders, the outer cylinder and the telescoping tubular members containing a liquid, said members being spaced to define an orifice communicating at all times with the outer cylinder, said orifice being the sole means of communication between said outer cylinder and the tubular member therein on the closure stroke of the strut, and a diaphragm extending transversely across the outer cylinder, the tubular member in the outer cylinder being connected at one end to said diaphragm, said diaphragm being spaced inwardly from the closed outer end of the outer cylinder to form a gas chamber at the outer end of that cylinder, said gas chamber communicating with the tubular member in the outer cylinder, so that on telescoping of the tubular members liquid may pass from said telescoping tubular members into said gas chamber.

30. A device of the class described including a cylinder comprising a wall dividing the same into spaced internal chambers, a hollow piston reciprocal within the chamber at one side of said wall, a metering pin carried by said wall and extending through a restricted opening in said piston to define a metering orifice therewith, and a passage extending longitudinally through said pin and communicating with the interior of said piston and with the chamber at the opposite side of said wall, said passage being closed against communication with the chamber at said one side of said wall except through said orifice.

CARL E. TACK.

REFERENCES CITED

The following references are of record in the file of this patent:

UNITED STATES PATENTS

| Number | Name | Date |
| --- | --- | --- |
| 2,171,185 | Maier | Aug. 29, 1939 |
| 2,092,644 | Erny | Sept. 7, 1937 |
| 2,174,312 | Cleveland | Sept. 26, 1939 |
| 2,209,603 | Johnson | July 30, 1940 |
| 2,313,242 | Johnson | Mar. 9, 1943 |
| 2,325,430 | Setz | July 27, 1943 |
| 1,886,712 | Messier | Nov. 8, 1932 |
| 2,069,791 | Wallace | Feb. 9, 1937 |
| 2,342,381 | Thornhill | Feb. 22, 1944 |

FOREIGN PATENTS

| Number | Country | Date |
| --- | --- | --- |
| 297,438 | Great Britain | Dec. 13, 1928 |
| 137,585 | Great Britain | Jan. 22, 1920 |